United States Patent
Kini et al.

(10) Patent No.: US 11,244,303 B2
(45) Date of Patent: Feb. 8, 2022

(54) INSTANT ACTIVATION DIGITAL PAYMENT SYSTEM WITH SEAMLESS DIGITAL WALLET INTEGRATION

(71) Applicant: Bank of America Corporation, Charlotte, NC (US)

(72) Inventors: Ritesh R. Kini, Seattle, WA (US); Amber J. Grant, Beacon, NY (US); Pankaj Shrivastava, Tega Cay, SC (US); Michael E. Gould, Scottsdale, AZ (US); Rajaram R. Kasarla, Frisco, TX (US); Carolyn A. Smith, Huntersville, NC (US); David B. Washam, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 102 days.

(21) Appl. No.: 16/196,241

(22) Filed: Nov. 20, 2018

(65) Prior Publication Data
US 2020/0104832 A1 Apr. 2, 2020

Related U.S. Application Data

(60) Provisional application No. 62/737,989, filed on Sep. 28, 2018.

(51) Int. Cl.
 G06Q 20/34 (2012.01)
 G06Q 20/24 (2012.01)
 G06Q 40/02 (2012.01)
 G06Q 20/36 (2012.01)
(52) U.S. Cl.
 CPC ........... *G06Q 20/354* (2013.01); *G06Q 20/24* (2013.01); *G06Q 20/36* (2013.01); *G06Q 40/025* (2013.01)

(58) Field of Classification Search
 CPC .... G06Q 20/354; G06Q 20/24; G06Q 40/025; G06Q 20/36; G06Q 20/20; G06Q 20/227; G06Q 20/3672; G06Q 20/4016
 See application file for complete search history.

(56) References Cited

U.S. PATENT DOCUMENTS

| | | | |
|---|---|---|---|
| 7,024,390 B1 | 4/2006 | Mori et al. | |
| 7,984,851 B2 | 7/2011 | MacGuire | |
| 8,464,940 B2 | 6/2013 | MacGuire | |
| 2006/0106691 A1* | 5/2006 | Sheaffer | G06Q 30/0242 705/35 |
| 2009/0144147 A1* | 6/2009 | Sheaffer | G06Q 30/0224 705/14.25 |
| 2011/0302084 A1* | 12/2011 | Melik-Aslanian | G06Q 20/24 705/44 |

(Continued)

OTHER PUBLICATIONS

A. K. Jain and S. Pankanti, "A touch of money [biometric authentication systems]," in IEEE Spectrum, vol. 43, No. 7, pp. 22-27, Jul. 2006, doi: 10.1109/MSPEC.2006.1653001 teaches applying biometric authentication to credit cards. (Year: 2006).*

*Primary Examiner* — Scott C Anderson
*Assistant Examiner* — Bolko M Hamerski
(74) *Attorney, Agent, or Firm* — Weiss & Arons LLP

(57) ABSTRACT

Aspects of the disclosure relate to high-security digital payment systems with instant activation. The systems may include multiple stages of authorization. The multiple stages of authorization may include increasing thresholds of criteria. The system may also include multiple payment instruments with seamless digital wallet integration.

11 Claims, 5 Drawing Sheets

(56) References Cited

U.S. PATENT DOCUMENTS

| | | | |
|---|---|---|---|
| 2014/0172679 A1* | 6/2014 | Shimko | G06Q 40/025 |
| | | | 705/38 |
| 2016/0292673 A1* | 10/2016 | Chandrasekaran | ........................ |
| | | | G06Q 20/3674 |
| 2017/0068953 A1* | 3/2017 | Kim | G06Q 20/382 |
| 2018/0158048 A1* | 6/2018 | Narasimhan | G06Q 20/363 |
| 2018/0276656 A1* | 9/2018 | Goyal | G06Q 20/3223 |
| 2019/0019195 A1* | 1/2019 | Dunjic | G06Q 40/02 |

* cited by examiner

INSTANT ACTIVATION DIGITAL PAYMENT SYSTEM WITH SEAMLESS DIGITAL WALLET INTEGRATION

CROSS-REFERENCE TO RELATED APPLICATION

This application is a non-provisional of U.S. Provisional Patent Application No. 62/737,989 filed Sep. 28, 2018 entitled "INSTANT ACTIVATION DIGITAL PAYMENT SYSTEM WITH SEAMLESS DIGITAL WALLET INTEGRATION" which is hereby incorporated by reference herein in its entirety.

FIELD OF TECHNOLOGY

Aspects of the disclosure relate to computer applications. Specifically, aspects of the disclosure relate to computer applications with secure payment systems and propagation of updates there within.

BACKGROUND OF THE DISCLOSURE

Consumers rely heavily upon the use of payment instruments. Payment instruments are used, for example, to pay bills, make purchases, and execute various transactions. One example of a payment instrument is a credit card.

A consumer may request and/or get approved for a payment instrument at a certain point in time. A number of days may elapse from that time until the consumer receives a tangible payment instrument in his or her possession. Time-consuming processes such as manufacture of the tangible payment instrument and transportation via the mail system may cause such time lapses.

Typically, a consumer must wait until a tangible payment instrument comes into his or her physical possession before the payment instrument can initially be activated. Therefore, the lapse of a number of days before receiving the tangible payment instrument, by extension, creates a lapse of a number of days before the payment instrument can be activated.

The lapse may create substantial problems for the consumer. The consumer may have bills to pay, purchases to make, and transactions to execute. The bills, purchases, and transactions may be urgent and time-sensitive. Waiting a number of days to activate the payment instrument may have significant and irreversible consequences. There is a need, therefore, for high-security payment systems with instant activation.

Furthermore, recent years have seen exponential growth in digital solutions associated with payment instruments. Such digital solutions include websites, computer programs, and computer applications. An example of a computer application may be a digital wallet. A consumer may load a digital wallet with payment instrument information. The consumer may be able to use the digital wallet similarly to a payment instrument, both in-person and online. It would be advantageous, therefore, to provide a high-security payment system with instant activation that further includes seamless integration with a digital application.

SUMMARY OF THE DISCLOSURE

Aspects of the disclosure relate to a multi-stage authentication system. The system may include a first qualification threshold. When the first qualification threshold is satisfied, the system may trigger initialization of a tangible, long-term payment instrument.

The long-term payment instrument may be activated manually at a time later than its initialization. The activation may be executed when the long-term payment instrument is received in the physical presence of a user. Receipt of the long-term payment instrument may occur a number of days after the initialization.

The system may include a second qualification threshold. When the second qualification threshold is satisfied, the system may trigger an option for an intangible, short-term payment instrument. When selected, the option may trigger initialization of the short-term payment instrument. The short-term payment instrument may be activated automatically in conjunction with its initialization.

The system may also include a computer application. When the short-term payment instrument is activated, the computer application may be updated to include the short-term payment instrument. When the long-term payment instrument is manually activated, the computer application may be automatically updated to replace the short-term payment instrument with the long-term payment instrument.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
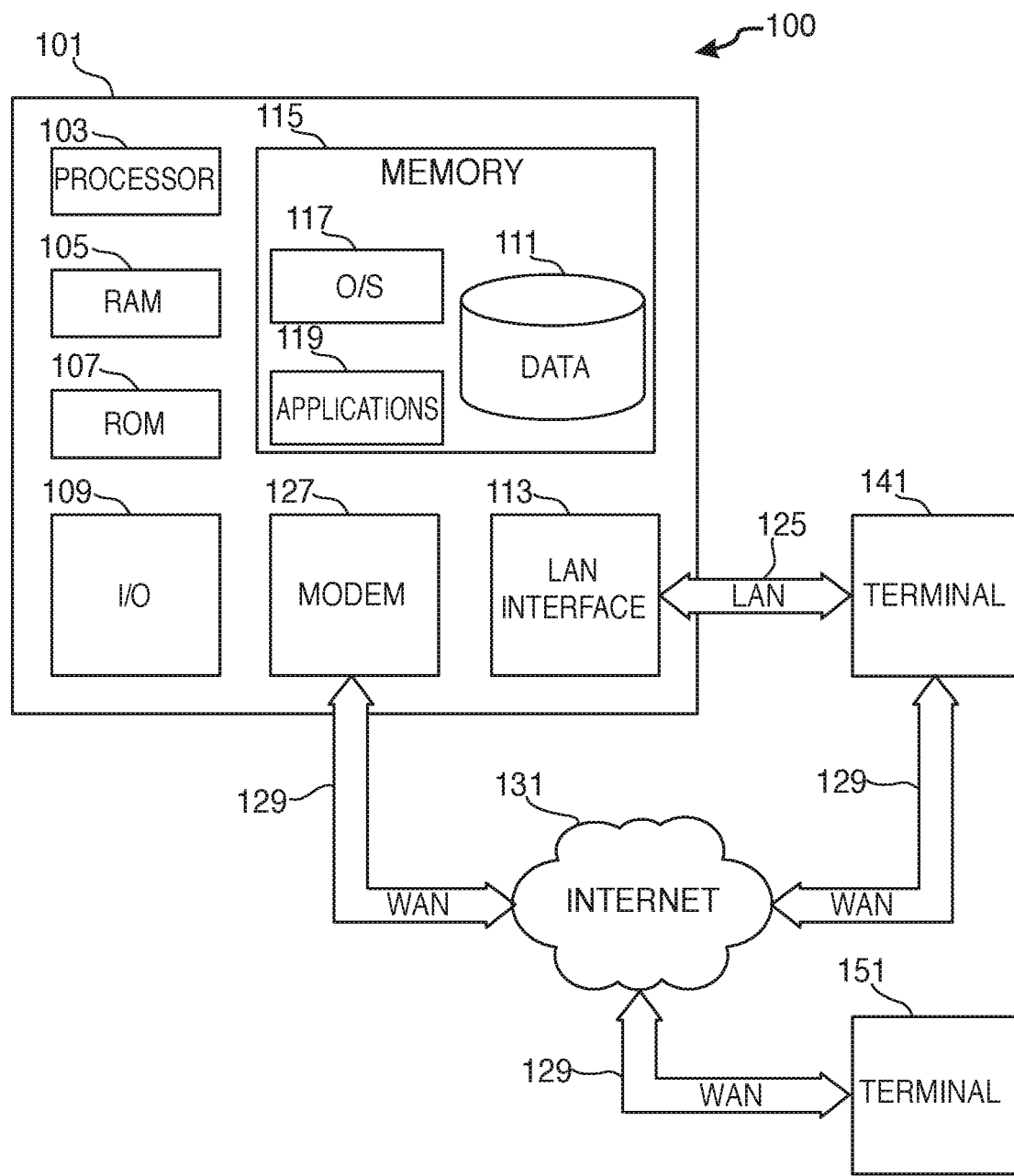
FIG. 1 shows an illustrative system in accordance with principles of the disclosure.

Aspects of the disclosure relate to a multi-stage authentication system. The system may include a first qualification threshold. When a user applies for a new, updated, and/or replacement payment instrument, a payment instrument provider may check if a user satisfies the first qualification threshold. The first qualification threshold may include a predetermined credit score, financial status or history profile, or any criteria for determining a level of suitability for the payment instrument. When the first qualification threshold is satisfied, the system may trigger initialization of a tangible, long-term payment instrument.

Initialization of a payment instrument may include creating or updating an account. Creating an account may include formulating an account number, expiration date, and card verification value ("CVV"). The CVV may be at least in part keyed to the expiration date. The initialization may include other features, such as a spending limit, and peripheral associations, such as a rewards program. The initialization may require authorization, communication, and integration among various departments within and outside of the payment instrument provider. The initialization may include an order for the manufacture of a tangible card to be sent to the user.

The long-term payment instrument may be activated manually at a time later than its initialization. Typically, activation of a payment instrument is a step that facilitates operability of the payment instrument. The activation may be executed when the long-term payment instrument is received in the physical presence of a user. Receipt of the long-term payment instrument may occur a number of days after the initialization. Manufacture of the payment instrument and transit via the mail system may account for the delay.

Activating the long-term payment instrument may require, because of security concerns, the physical presence of a tangible payment instrument. One concern may include the risk of a malicious actor intercepting the tangible payment instrument while it is in transit to the user. Another concern may include the unsafe nature of communicating to the user any information that would allow the user to operate the payment instrument prior to physically receiving it. For example, relaying an account number, expiration date, and CVV code to a user via data communication—e.g., telephone, text message, email, etc.—may be susceptible to hacking, interception, or otherwise being obtained by a malicious actor. The present system addresses these problems.

The system may include a second qualification threshold. In some embodiments, the second qualification threshold may be checked after a user satisfies the first qualification threshold. The second qualification threshold may include criteria that are different and/or more difficult to satisfy than criteria included in the first qualification threshold. For example, the second qualification threshold may include a credit score that is higher than a credit score required for the first qualification threshold. In some embodiments, the second qualification threshold may include criteria such as a device that is registered to the user. Another criterion for the second qualification threshold may include a computer application, such as a digital wallet, to be installed on the device. Other criteria for the second qualification threshold may include heightened fraud protections, such as the absence of recent password changes and the absence of any fraud alerts or flags.

In certain embodiments, the second qualification threshold may be checked automatically if a user satisfies the first qualification threshold. In some embodiments, the user may be queried before the second qualification threshold is checked. For example, a user may be asked if he or she is interested in instant activation of the payment instrument. In some embodiments, checking the second qualification threshold may be subject to preselected or targeted offers.

In some embodiments, the second qualification threshold is preferably only checked if other criteria are satisfied. Examples of other criteria may include the user being enrolled or opted-in to certain offers and/or features. Other examples may include specific payment instrument types, for example, credit cards that are not secured cards (i.e., a card where the spending limit is secured by a deposit) or student products.

When the second qualification threshold is satisfied, the system may trigger presentation of an option for an intangible, short-term payment instrument. When selected, the option may trigger initialization of the short-term payment instrument. In an alternative embodiment, the short-term payment instrument may be initialized without presentation and selection of the option.

The short-term payment instrument may be activated automatically with its initialization. Initialization of the short-term payment instrument may include creating or updating an account. Creating an account may include formulating an account number, expiration date, and/or CVV. The account number of the short-term payment instrument may be the same as the account number of the long-term payment instrument. The expiration date and the CVV of the short-term payment instrument may be different from the expiration date and CVV of the long-term payment instrument. In some embodiments, the account numbers of the short- and long-term payment instruments may differ. In certain embodiments, the CVV's of the short- and long-term payment instruments may be the same. In yet other embodiments, the short- and long-term payment instruments may share none, some, or all of their account numbers, expiration dates, and CVVs.

The system may also include a computer application. The computer application may include financial functionality. The financial functionality may feature the ability to include payment instruments. Including a payment instrument may provide the operability of the payment instrument both online and at brick-and-mortar locations. The computer application may use provisioning and tokenization processes to provide security. An exemplary computer application may be a digital wallet.

When the short-term payment instrument is activated, the computer application may be updated to include the short-term payment instrument. The updating may include provisioning and assigning tokens. A process may be defined to identify new accounts from a channel associated with the creation of new payment instrument accounts. The process may allow provisioning of an account number that will allow for unique identification and treatment of authorizations from the provisioned account. The process may include messages, scripts, indicators, data fields, and/or any other suitable contributing elements.

In certain embodiments, all the information associated with the short-term instrument may be accessible. In these embodiments, accessing some or all of the information may require additional forms of authentication. In other embodiments, only a portion of the information may be accessible. For example, in some embodiments of the system, only the last four digits of a 16-digit account number associated with the short-term payment instrument may be accessible while the short-term payment instrument is active. Furthermore, the short-term payment instrument may only be useable via the computer application. This may provide a relatively high level of security.

When the long-term payment instrument is manually activated, the computer application may be automatically updated to replace the short-term payment instrument with the long-term payment instrument. Automatic update may be seamless—i.e., without any user input or activity. The user may be unaware of the update process. The update process may include provisioning and update of tokens.

In certain embodiments of the system, each qualification threshold includes at least a predetermined credit score, or some similar metric. In some embodiments, the first qualification threshold may be lower than the second qualification threshold.

In certain embodiments of the system, the second qualification threshold comprises a group of criteria. The group of criteria may include: a predetermined credit score; enrollment of a device in a digital wallet; registration, for at least 30 days (or some other suitable amount of time), of the device to a current user; absence of a "be alert" flag; and/or a password that is at least 14 days old. The predetermined credit score criterion may be a Fair Isaac Corporation ("FICO") score of at least 660, or any other suitable score.

In some embodiments of the system, the long-term payment instrument may be a tangible credit card. The tangible credit card may be initialized with an account number and an expiration date. The account number may be the same as an account number of the short-term payment instrument. The expiration date may be approximately 4 years after the initialization of the tangible credit card. The expiration date may also be any other suitable date.

In certain embodiments of the system, the manual activation of the long-term payment instrument may be executed by a user upon receipt of the payment instrument. The activation may involve internet communication. Activation via internet communication may include sending or responding to an email, accessing and/or selecting an option on a webpage, or accessing and/or selecting an option on a mobile application. The activation may involve an automated system in response to a telephone communication. Activation via the automated system may include calling a phone number and conveying an account number. The conveying may be automatic, through recognition of a caller phone number that is associated with the account, or manual, through typing or verbally communicating the account number over the telephone. The automated system may activate the payment instrument, automatically, when the account number is conveyed. In some embodiments, the activation may be executed with traditional, non-automatic, telephone communication—e.g., via verbally conveying an account number to a phone representative.

In some embodiments of the system, the short-term payment instrument may be a digital credit card that is initialized with an account number and an expiration date. The account number may be the same as an account number of the long-term payment instrument. The expiration date may be less than 4 years, or any other suitable amount of time, after the initialization of the digital credit card.

In certain embodiments of the system, the expiration date of the short-term payment instrument may be 30 days after its initialization. The expiration date may, in the alternative, be 7, 14, 15, 20, 21, 45, 60, 75, 90, or any other suitable short-term number of days after the initialization. The expiration may also depend on a billing cycle—e.g., at the end of a first, second, or third billing cycle, or any other suitable billing cycle after the initialization.

In some embodiments, the short-term payment instrument may be terminated when the long-term payment instrument is activated. Activation of the long-term payment instrument may directly trigger the termination. Alternatively, the long-term payment instrument may be periodically, or substantially continuously, checked for activation. Certain events, for example an attempt to use the short-term payment instrument, may also trigger a check on the long-term payment instrument activation status.

In some embodiments of the system, the short-term payment instrument and the long-term payment instrument may be initialized at substantially the same time. For example, a payment instrument provider may hold off on initializing the long-term payment instrument until it ascertains whether a short-term instrument will be provided as well. Alternatively, the long-term and short-term payment instruments may be initialized one after the other. For example, the long-term instrument may be initialized, and, subsequently, the short-term instrument may be initialized.

In certain embodiments of the system, the computer application may be a digital wallet. In some embodiments, the digital wallet may require biometric authentication in operation. Operation of a digital wallet may include making a purchase or executing a transaction. Requirement of biometric authentication for operation may thereby provide an additional layer of security for, inter alia, an instantly activated payment system.

In some embodiments, a high-security, dual-pronged payment system is provided. The system may feature instantaneous activation and seamless integration with computer applications. The system may include a first payment instrument. The first payment instrument may be initialized with an account number and a first expiration date. The first payment instrument may be configured to be activated upon its initialization. The first payment instrument may also be incorporated into a computer application in response to the activation.

The system may also include a second payment instrument. The second payment instrument may be initialized with an account number and a second expiration date. The account number may be the same as the account number of the first payment instrument. The second expiration date may be later than the first expiration date.

The second payment instrument may be configured to be activated at a time that is after the initialization of the second payment instrument. The time may be after the second payment instrument is received in the physical presence of a user. The second payment instrument may be incorporated into the computer application after the activation. Incorporation of the second payment instrument into the computer application may be automatic. The incorporation may seamlessly replace the first payment instrument in the computer application.

In some embodiments of the system, the first payment instrument may only be useable via the computer application. Furthermore, only the last four digits of the account number may be accessible to a user until the user receives the second payment instrument.

In certain embodiments of the system, the first payment instrument may have a qualification threshold that is higher than a qualification threshold of the second payment instrument. Each qualification threshold may include at least a predetermined credit score.

In one embodiment, the qualification threshold of the first payment instrument may include a group of criteria. The group of criteria may include, for example: a predetermined credit score; enrollment of a device in a digital wallet; registration, for at least 30 days, of the device to a current user; absence of a "be alert" flag; and/or a password that is at least 14 days old, or some other suitable amount of time. The predetermined credit score may be a Fair Isaac Corporation ("FICO") score of at least 660, or some other suitable score.

In some embodiments, after a user satisfies the qualification threshold of the second instrument, he or she may be presented a selectable option for the first payment instrument. The selectable option may preferably be presented only if the user satisfies the qualification threshold of the first payment instrument.

In certain embodiments, the first payment instrument may be a credit card that is absent a tangible embodiment. The first expiration date may be less than four years after the initialization of the first payment instrument. In one embodiment, the first expiration date may be 30 days after the initialization of the first payment instrument.

In some embodiments, the second payment instrument may be a credit card with a tangible embodiment. The second expiration date may be four years (or any other suitable amount of time) after the initialization of the second payment instrument. Alternatively, the 4-year period may initiate after the expiration or termination of the first payment instrument.

In certain embodiments of the system, the second payment instrument may be activated manually by a user when the user receives a tangible second payment instrument. The manual activation of the second payment instrument may be executed via internet communication, via telephone communication, or via an automated system in response to a telephone communication.

In some embodiments of the system, the first payment instrument and the second payment instrument may be initialized at substantially the same time. In certain embodiments, the first payment instrument may be terminated when the second payment instrument is activated.

The computer application of the system may be a digital wallet. In operation, the digital wallet may require biometric authentication. The digital wallet may include any other suitable steps, such as a password protected login, for authentication and/or verification. The digital wallet may thereby provide a third qualification threshold for the system.

In certain embodiments, methods for authenticating payment instrument systems are provided. The payment instrument systems may feature instant activation and seamless integration with digital applications.

The method may include initializing a tangible, long-term payment instrument in an inactive state when a first qualification threshold is satisfied.

The method may also include presenting a selectable option for an intangible, short-term payment instrument when a second qualification threshold is satisfied.

The method may further include initializing the short-term payment instrument in an active state when the selectable option is selected. The short-term payment instrument may be incorporated into a computer application.

When the long-term payment instrument is manually activated, the method may include terminating the short-term payment instrument. The method may also include seamlessly replacing the short-term payment instrument with the long-term payment instrument in the computer application.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may be included in a transfer event or an escape event. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server may not need to stream the data to the computer system. This may be beneficial for the computer system, because the retrieval may be faster than data-streaming. Users may not become frustrated because they do not need to wait to run the applications. Conventionally, streaming data requires heavy usage of the processor and the cache memory. If the data is stored in the computer system's memory, retrieval of the data may not require heavy processor and cache memory usage. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "applications" or "apps") may include computer executable instructions for invoking user functionality related performing various tasks. The various tasks may be related to the user's finances, shopping, recreation, relationships, or other business or personal affairs.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement services provided by the central application, secondary applications, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
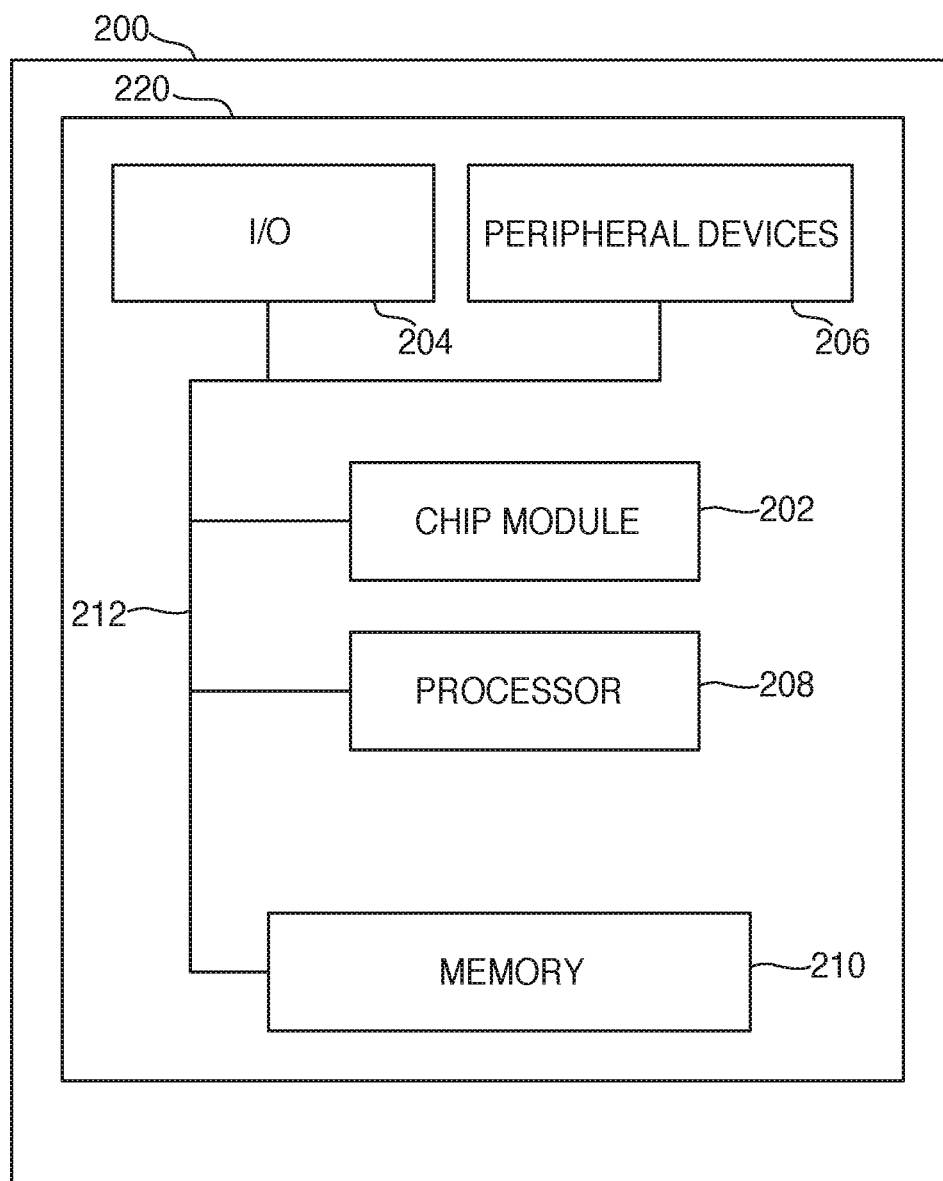
FIG. 2 shows another illustrative system in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
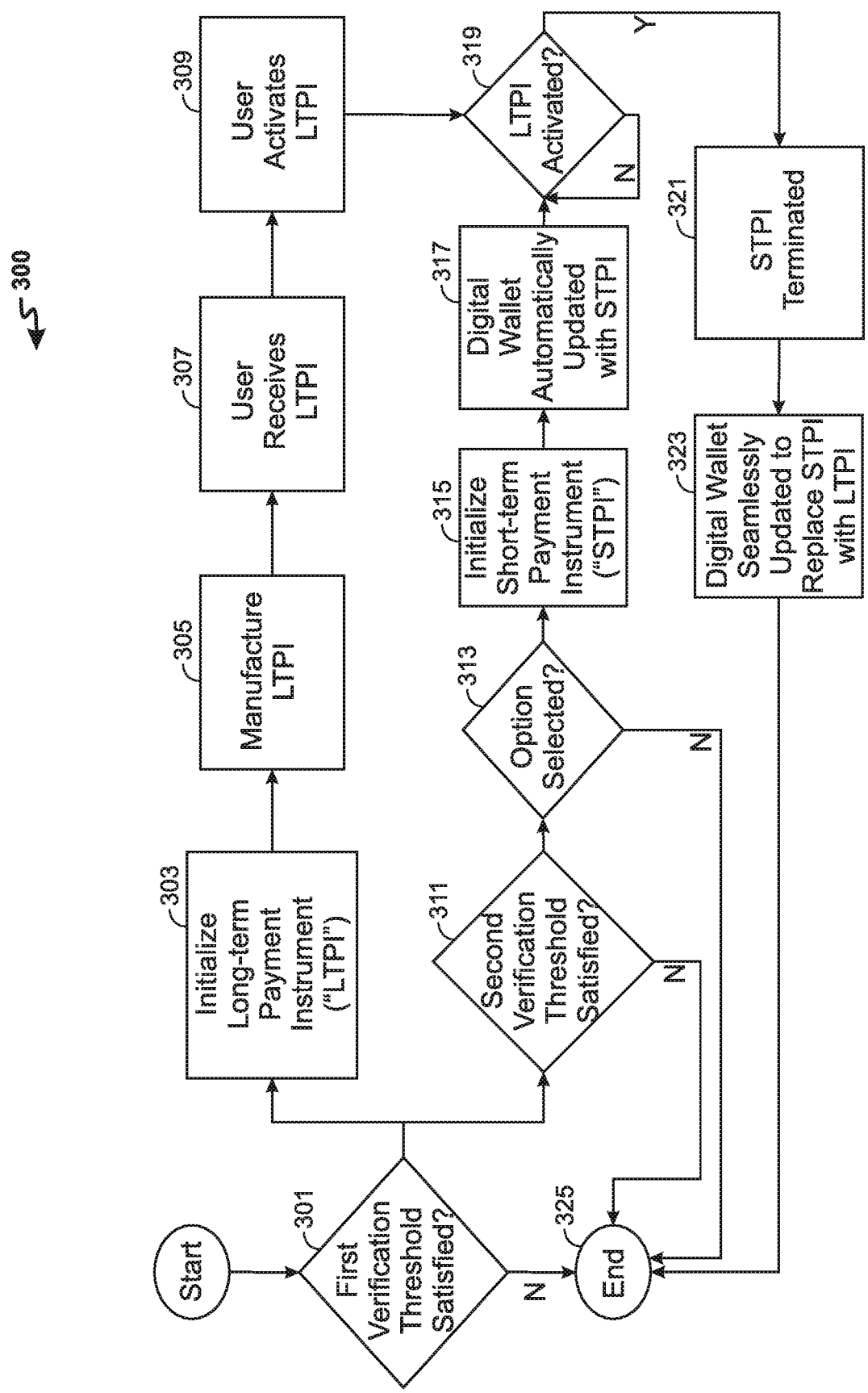
FIG. 3 shows an illustrative flowchart in accordance with principles of the disclosure.

FIG. 3 shows illustrative flowchart 300 of a process in accordance with principles of the disclosure. Flowchart 300 represents one embodiment. Flowchart 300 may include steps that are optional, and may omit steps that are present in other embodiments. The ordering of the steps may differ in other embodiments as well.

Flowchart 300 may start at step 301. Step 301 queries whether a first verification threshold was satisfied. If the first verification threshold was not satisfied, the process may end at step 325. If the first verification threshold was satisfied, the process may branch into two parallel tracks (beginning with steps 303 and 311, respectively). The two tracks may represent two prongs of a two-pronged payment system. The two-pronged payment system may include creation of two accounts. In some embodiments, the two accounts may be considered and/or construed as one account internally.

The first track may proceed with step 303. At step 303, a long-term payment instrument may be initialized. At step 305 the long-term payment instrument may be manufactured. Manufacturing the instrument may include forming and/or finishing the instrument. Finishing the instrument may include printing, embossing and/or magnetizing information on a card. A user may receive the long-term payment instrument at step 307. At step 309 the user may activate the long-term payment instrument. Activating the long-term payment instrument may feed into step 319 of the process.

The second track may proceed with step 311. Step 311 queries as to whether a second verification threshold was satisfied. If it was not satisfied, the process may end at step 325. If the second verification threshold was satisfied, the process may proceed to step 313 and query if an option was selected. If the option was not selected, the process may end at step 325. If the option was selected, the process may continue with step 315.

An example of selecting an option may occur during use of a banking app. The app may process a request for a payment instrument for a user. The user may be a customer. The payment instrument may be a new, updated, or replacement payment instrument. The payment instrument may be a long-term, tangible, credit card. The user may be approved for the long-term credit card by satisfying the first verification threshold. It may be established that the user satisfies a second verification threshold to qualify for a short-term, digital payment instrument. The digital payment instrument may be configured to feature instant activation.

The second threshold to qualify for a digital payment instrument may be different than the first threshold to qualify for a tangible payment instrument. The digital payment instrument threshold may be higher than that of a tangible payment instrument. Qualifying for a digital payment instrument may require a certain credit score, a certain level of confidence of identity authentication, little or no suspicion of historical fraudulent activity, or any other suitable qualification threshold. Qualifying for a digital payment instrument may require a device with a digital wallet. A user may be prompted to download a digital wallet to qualify.

A qualifying user may be offered an option to opt-in to a digital payment instrument. The option may be offered on a screen while using an app. The option may also be offered via a website, program, in person, or during the course of a telephone conversation. Selecting this option may satisfy step 313 in the affirmative.

If the option has been selected, the process may continue with step 315. At step 315, the short-term payment instrument is initialized. At step 317, a digital wallet (or other financial computer application) may be updated to include the short-term payment instrument. From the vantage point of a user experience, step 317 may provide payment instrument operability, and may be accomplished substantially instantly after selecting the option for the short-term payment instrument. Thus, the user may be provided with a payment system having substantially instant activation.

After step 317 is accomplished, the process may query, at step 319, if the long-term payment instrument was activated. The query may be periodic (e.g., daily, possibly associated with batch activity, or monthly, possibly associated with a billing cycle, or any other suitable periodicity), event-based (e.g., attempted use of the short-term payment instrument, or receipt of an alert that the long-term payment instrument was activated), or substantially continuous. If it is not determined that the long-term payment instrument has been activated, the process may loop back to step 319. While the process is looping, the user may continue to have usability from the short-term payment instrument via the digital wallet. If it is determined that the long-term payment instrument has been activated, the process may continue with step 321.

At step 321, the short-term payment instrument may be terminated. In some embodiments, the short-term payment instrument may not be terminated, and may remain active until expiration. At step 323, the digital wallet may be automatically and seamlessly—i.e., without human intervention—updated to replace the short-term payment instrument with the long-term payment instrument. The seamless update may include changing an expiration date and, in some embodiments, a CVV (and/or an account number), in the digital wallet. The seamless update may be accomplished without any user input or activity. The seamless update may be unnoticed by the user. A user may thus be provided with a high-security payment system with instant activation and seamless integration with computer applications.

Figure 4:
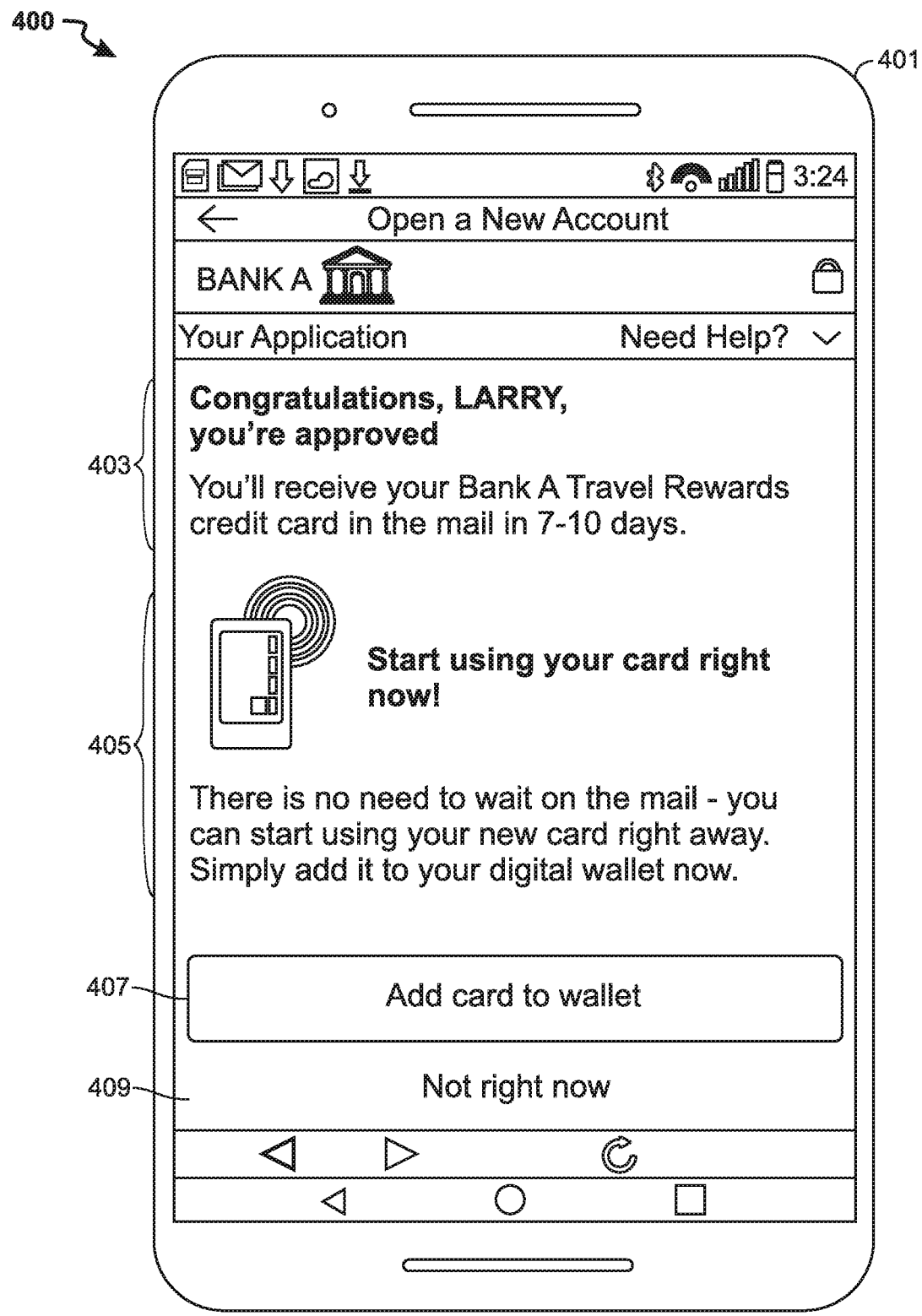
FIG. 4 shows an illustrative system in accordance with principles of the disclosure.

FIG. 4 shows an illustrative system 400 that includes screen 401. Screen 401 shows an exemplary selectable option for a short-term, intangible payment instrument. Screen 401 may be shown to a user who satisfies a first qualification threshold, and has been approved for a long-term, tangible payment instrument. In some embodiments, screen 401 may only be shown to a user who also satisfied a second qualification threshold. In other embodiments, the second qualification threshold may be checked only after a user selects the selectable option.

Screen 401 may include text 403. Text 403 may include a message informing the user of approval for a tangible, long-term, payment instrument. Screen 401 may also include text 405. Text 405 may include a message informing the user of the option for instant activation.

Screen 401 may also include selectable bars 407 and 409. Selecting bar 407 may constitute selecting an option for the short-term payment instrument, and may trigger initialization, activation, and/or digital wallet integration of the short-term payment instrument. Selecting bar 409 may terminate the option. In some embodiments, even after bar 409 is selected, the option may still be available at a later date (e.g., until activation of the long-term, tangible, payment instrument).

Screen 401 may be part of a sequence of screens showing additional information, disclosures, conditions, and/or terms.

Figure 5:
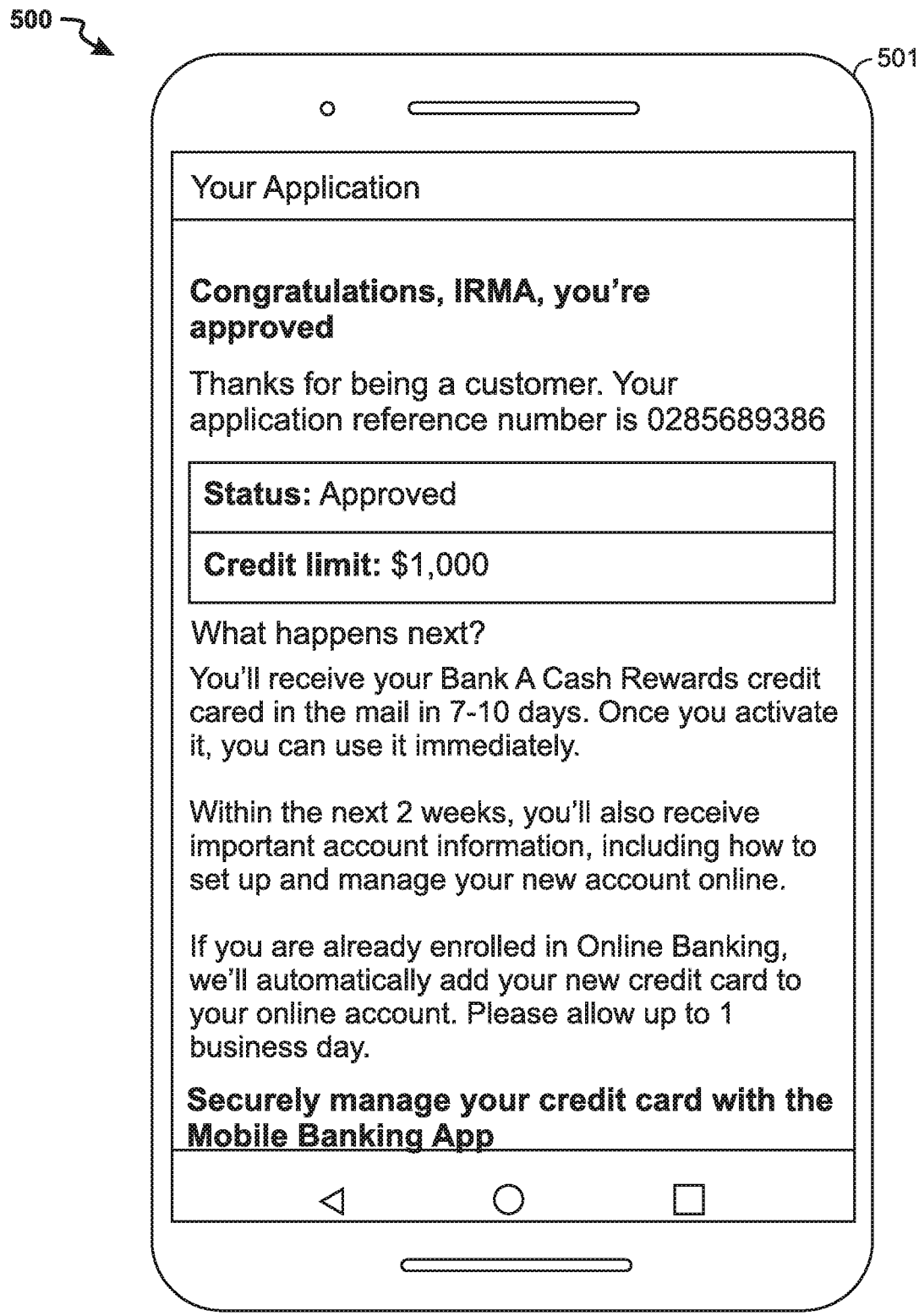
FIG. 5 shows another illustrative system in accordance with principles of the disclosure.

FIG. 5 shows an illustrative system 500 that includes screen 501. Screen 501 shows an exemplary screen that may be shown to a user. The user may have satisfied a first qualification threshold, and been approved for a long-term, tangible payment instrument. The user, however, may not have satisfied a second qualification threshold and/or other criteria for a short-term, intangible payment instrument. Screen 501 may contain text informing the user of approval for the tangible, long-term, payment instrument. Screen 501 may not contain any options for a short-term, intangible payment instrument.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for instant activation digital payment systems with seamless digital wallet integration are provided. Persons skilled in the art will appreciate that the present invention can be practiced by other than the described embodiments, which are presented for purposes of illustration rather than of limitation. The present invention is limited only by the claims that follow.

What is claimed is:

1. A computer-based payment system with multi-stage authentication, said system comprising:
   a first payment instrument comprising a tangible instrument and enabling account access following activation, wherein the first payment instrument is initialized via a central server when a first qualification threshold is satisfied and is activated manually at a time other than the initialization;

a second payment instrument, the second payment instrument comprising a digital payment instrument and enabling account access during a period between the initialization of the first payment instrument and the activation of the first payment instrument, wherein the second payment instrument is initialized and automatically activated via the central server in response to initialization of the first payment instrument and satisfaction of a second qualification threshold; and a computer application;

wherein:

the second qualification threshold comprises a group of criteria that includes:
a predetermined credit score;
enrollment of a device in a digital wallet;
registration, for at least 30 days, of the device to a current user;
absence of a "be alert" flag; and
a password that is at least 14 days old;

when the second payment instrument is automatically activated, the computer application is updated to include the second payment instrument, the updating comprising automatic provisioning and assigning of tokens, wherein a full account number associated with the second payment instrument is inaccessible to a user and the second payment instrument is only operable via the computer application;

when the first payment instrument is manually activated, the computer application is automatically updated to replace the second payment instrument with the first payment instrument; and the computer application is configured to authenticate a biometric input prior to execution of a transaction using the second payment instrument, the biometric authentication comprising a third qualification threshold.

2. The system of claim 1, wherein the first qualification threshold is lower than the second qualification threshold, and wherein each qualification threshold includes at least a predetermined credit score.

3. The system of claim 1, wherein the predetermined credit score is a Fair Isaac Corporation ("FICO") score of at least 660.

4. The system of claim 1, wherein the manual activation of the first payment instrument is executed after the first payment instrument is received into the physical presence of the user, and the manual activation of the first payment instrument is executed either via internet communication or via an automated system in response to a telephone communication.

5. The system of claim 1, wherein the first payment instrument is a tangible credit card that is initialized with an account number and a first expiration date that is at least 4 years after the initialization of the tangible credit card, and the second payment instrument is a digital credit card that is initialized with:
an account number that is the same as the account number of the tangible credit card; and
a second expiration date that is less than 4 years after the initialization of the digital credit card.

6. The system of claim 5, wherein the second expiration date is 30 days after the initialization of the digital credit card.

7. The system of claim 1, wherein the second payment instrument is terminated when the first payment instrument is activated.

8. The system of claim 1, wherein the computer application is a digital wallet, and, in operation, the digital wallet requires biometric authentication.

9. A method for authenticating payment instrument systems, said method comprising:
initializing, at a central server, when a first qualification threshold is satisfied, a tangible, first payment instrument in an inactive state;
presenting, when a second qualification threshold is satisfied, a selectable option for an intangible, second payment instrument;
initializing, at the central server, when the selectable option is selected, the second payment instrument in an active state;
incorporating the second payment instrument into a computer application, via automatic provisioning and token assignment; and
when the first payment instrument is manually activated:
terminating the second payment instrument; and
replacing the second payment instrument with the first payment instrument in the computer application;

wherein:

each qualification threshold includes at least a predetermined credit score;
the first qualification threshold is lower than the second qualification threshold;
the second qualification threshold comprises a group of criteria that includes:
a predetermined credit score;
enrollment of a device in a digital wallet;
registration, for at least 30 days, of the device to a current user;
absence of a "be alert" flag; and
a password that is at least 14 days old; and
the computer application is configured to authenticate a biometric input prior to execution of a transaction using the second payment instrument, the biometric authentication comprising a third qualification threshold.

10. The method of claim 9, wherein the computer application is a digital wallet, said digital wallet comprising a third qualification threshold, and wherein only the last four digits of a 16-digit account number associated with the second payment instrument are accessible to a user, and the second payment instrument is only operable via the digital wallet.

11. The method of claim 9, wherein the first payment instrument is a tangible credit card that is initialized with an account number and a first expiration date that is at least 4 years after the initialization of the tangible credit card, and the second payment instrument is a digital credit card that is initialized with:
an account number that is the same as the account number of the tangible credit card; and
a second expiration date that is less than 1 year after the initialization of the digital credit card.

* * * * *

UNITED STATES PATENT AND TRADEMARK OFFICE
CERTIFICATE OF CORRECTION

| | | |
|---|---|---|
| PATENT NO. | : 11,244,303 B2 | Page 1 of 1 |
| APPLICATION NO. | : 16/196241 | |
| DATED | : February 8, 2022 | |
| INVENTOR(S) | : Kini et al. | |

It is certified that error appears in the above-identified patent and that said Letters Patent is hereby corrected as shown below:

On the Title Page

Item (72), please add the following after David B. Washam, Charlotte, NC (US):
--Amar Nath Reddy Atla, Concord, NC (US)--

Signed and Sealed this
Nineteenth Day of November, 2024

Katherine Kelly Vidal
*Director of the United States Patent and Trademark Office*